United States Patent [19]

Drewery et al.

[11] 4,058,836

[45] Nov. 15, 1977

[54] NOISE REDUCTION IN TELEVISION SIGNALS

[75] Inventors: John Oliver Drewery, Coulsdon; Martin Weston, Epsom, both of England

[73] Assignees: The Marconi Company Limited; Standard Telephones & Cables Limited, both of London, England

[21] Appl. No.: 680,054

[22] Filed: Apr. 26, 1976

[30] Foreign Application Priority Data

Apr. 25, 1975 United Kingdom ............... 17331/75

[51] Int. Cl.$^2$ ............................................. H04N 5/21
[52] U.S. Cl. .................................................. 358/167
[58] Field of Search ............... 178/DIG. 12, DIG. 25, 178/7.1, 7.3 R, DIG. 34, 6.8, 7.3; 358/36, 37, 167

[56] References Cited

U.S. PATENT DOCUMENTS 3,920,889   11/1975   Connor ..................... 178/DIG. 34

Primary Examiner—John C. Martin
Attorney, Agent, or Firm—Kemon & Estabrook

[57] ABSTRACT

Reduction of noise in a television signal is achieved by comparing signals from successive frame or field scans and noting the differences. Low amplitude differences are assumed to represent noise and are attenuated. Differences above a predetermined level are assumed to represent movement and are not so attenuated by a factor K. Where there are inherent differences between the signals compared, for example they are different fields of an interlaced scan or are color signals with different subcarrier phases, the signal from the earlier scan is modified to compensate for these differences and provide a signal for comparison which is a better estimate of the expected signal on the later scan.

9 Claims, 7 Drawing Figures $$1 - \frac{V_T}{|V_{IN}|}\left(1 - \frac{1}{K}\right)$$

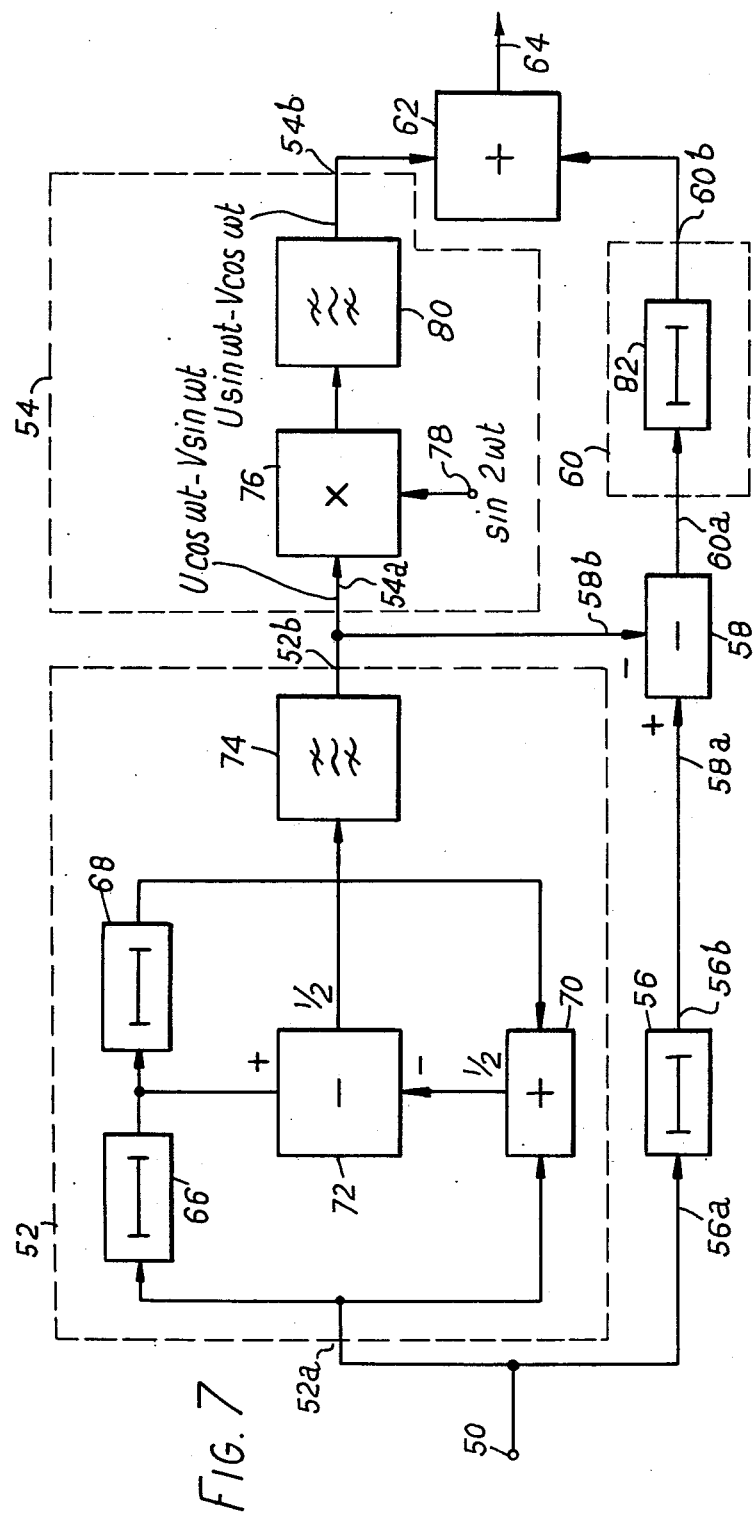

NOISE REDUCTION IN TELEVISION SIGNALS

This invention relates to a method of and apparatus for reducing the effect of noise in an electrical input signal which is obtained by scanning.

Television signals are obtained by scanning an image and always contain noise, whether that image be formed in a conventional television camera or from a cine film. In particular, the increasing use of smaller film stocks means that noise due to film grain becomes significant compared with the wanted image signal. To reduce the perturbations caused by noise it is necessary to discriminate against them while leaving stationary and moving image detail as far as possible unaffected.

Filters which operate within the field scan must be extremely ingenious if they are to distinguish between noise and fine spatial detail in the image. On the other hand, filters which operate on the signals of successive field scans can readily distinguish between noise and stationary picture detail, but the difficulty now is that moving images are impaired.

According to this invention there is provided a method of reducing the effect of noise in an electrical input signal which is obtained by scanning, to provide an output signal, comprising the steps of subtracting from the input for the current scan the said output signal for a preceding scan to provide a difference signal, attenuating low-amplitude portions of the difference signal relative to high-amplitude portions thereof, and adding the thus-attenuated signal to the said output signal for the preceding scan to provide an output signal for the current scan.

According to the invention there is also provided apparatus for use in the above-defined method, comprising input and output terminals, a delay device coupled to the output terminal for providing a delay time of substantially one scan, a subtractor coupled to the input terminal and to the output of the delay device for providing a difference signal representative of the difference between the input signal during the current scan and the output signal during a preceding scan, an attenuation circuit coupled to the output of the subtractor and arranged to attenuate low-amplitude portions of the difference signal relative to high-amplitude portions thereof, and an adder having inputs coupled to the outputs of the attenuation circuit and of the delay device and having an output coupled to the output terminal.

Preferably the transfer characteristic of the attenuation circuit is such that below a predetermined input level the output/input characteristic has a slope of 1/K, where K ($>$ 1) is the attenuation factor, and above the predetermined level the slope is approximately unity. At the predetermined level there is a discontinuity in slope but no discontinuity in the characteristic itself.

The attenuation circuit may comprise a multiplier of which one input is coupled to the subtractor output and the other input is coupled to the output of a non-linear transfer characteristic element which in turn is coupled to the subtractor output. A predictor circuit may be included in the path of the signal through the delay device to compensate for inherent differences between the input signals during the current and preceding scans.

When used with a television signal the delay device may provide a delay time of one field period or one picture period as is convenient.

The invention will be described in more detail by way of example with reference to the accompanying drawings, in which:

FIG. 7 is a block circuit diagram of a predictor suitable for use in apparatus of the type shown in FIG. 5 having a frame store, for processing composite PAL signals in analogue form.

Figure 1:
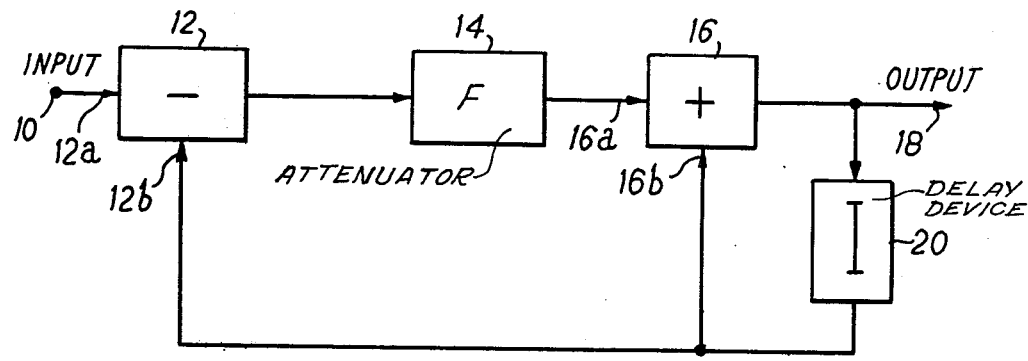
FIG. 1 is a block circuit diagram of noise-reduction apparatus embodying the invention.

The noise-reduction apparatus shown in FIG. 1 has an input terminal 10 for receiving an input signal of a type which is generated by scanning, in this case a television signal. The input terminal 10 is connected to the non-inversion input 12a of a subtractor 12, the difference signal from which is applied to an attenuation circuit 14. The output of circuit 14 is connected to one input 16a of an adder 16 the output of which is connected to an output terminal 18 and to the input of a delay device 20. The delay device is adapted to provide a delay time exactly equal to one picture period $T_p$ of the television signal, that is two field scans for an interlaced signal. The output of the delay device 20 is applied both to the inversion input 12b of the subtractor 12 and to the other input 16b of the adder 16.

Figure 2:
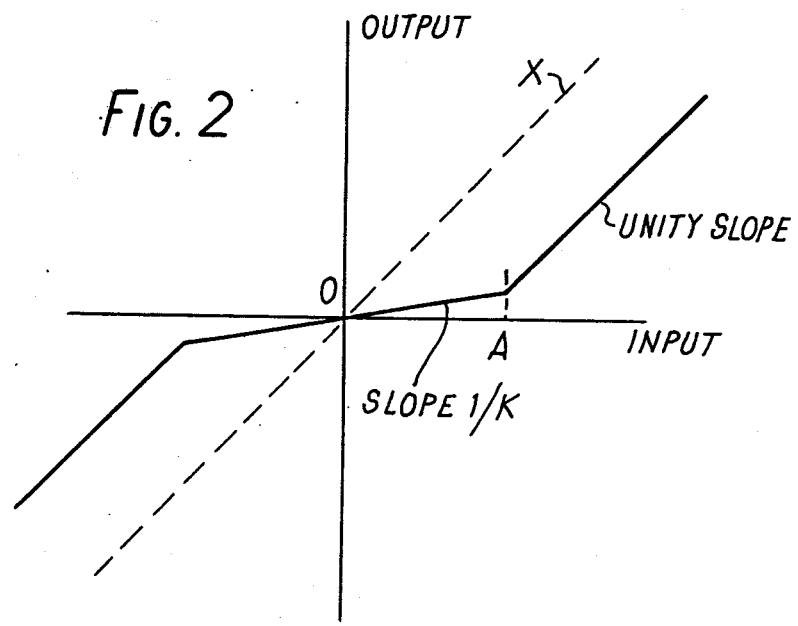
FIG. 2 shows the transfer characteristic of the attenuation circuit in the apparatus of FIG. 1.

The transfer characteristic of the attenuation circuit 14 is shown in FIG. 2. The characteristic passes through the origin O, and is symmetric for plus and minus values. Up to a predetermined difference signal amplitude A, the circuit provides attenuation by an attenuation factor K. Above amplitude A the characteristic has unity slope. In so far as the characteristic is parallel to and spaced from the dashed line X passing through the origin O the effect is to apply a decreasing amount of attenuation as the difference signal amplitude increases. Thus it is seen that low-amplitude portions of the difference signal will be attenuated relative to high-amplitude portions thereof. It is to be noted that while there is a discontinuity in slope at input amplitude A, there is no discontinuity in the actual characteristic itself.

Referring again to FIG. 1, each input signal has subtracted from it the output signal for the preceding picture period as supplied by the delay device to produce a difference signal representing the differences between the current and preceding picture periods. This difference signal is passed through the attenuator 14, and the attenuated difference signal is now added back to the output signal for the preceding picture to provide the output signal for the current picture.

Were the attenuator 14 to be omitted (or to possess the characteristic X of FIG. 2), then each input signal would have the output of the delay device 20 subtracted from it in subtractor 12 and added to it in adder 16, so that the output of the apparatus would be the same as the input.

Over the range for which the circuit 14 provides attenuation with an attenuation factor of 1/K, the action of the filter is to form the output picture from a weighted average of all previous output pictures, the weighting factors decreasing exponentially back in time. For large values of K, the time constant is approximately K picture periods. For difference signal amplitudes greater than A, the effect is gradually to reduce the value of K towards unity, thus tending to produce less and less averaging as the input amplitude increases.

The amplitude A is fixed empirically at a level such that it is greater than most of the noise but less than most of the changes caused by moving picture detail. Thus when noise appears on a stationary picture it is in general considerably attenuated and smoothed while the picture is substantially unimpaired. For large differences between pictures, such as result from movement in the image, the attenuation factor approaches unity and the differences are thus transmitted through the attenuator without significant loss.

There tends to be some slight loss of texture on moving detail, and because the attenuation factor never quite equals unity there is some blurring on the tail edge of moving detail, but these effects are small and usually less objectionable than the original noise.

The exact shape of the transfer characteristic for optimum balance between noise reduction and movement impairment depends on the level of noise. The characteristic should however have a low slope near the origin and a near-unity slope for high input values. Discontinuities in the characteristic should be avoided as they can provide a "tearing" effect on moving edges.

In one device having the characteristic shown in FIG. 2, the amplitude A was 1/64 of peak white amplitude, and the value of K was preferably 4, although values of 2 and 8 were found to give useful results.

It will be appreciated that the delay device 20 is required to be of exceptional accuracy and it is therefore preferably a clocked storage device which receives the input signal in sampled form. This being so it is convenient for the whole circuit to operate with digital signals, in which case the circuit 14 can be constituted by a read-only memory. For use in an analogue system it is then necessary to include an analogue-to-digital converter before the input terminal 10 and a digital-to-analogue converter after the output terminal 18.

Figure 3:
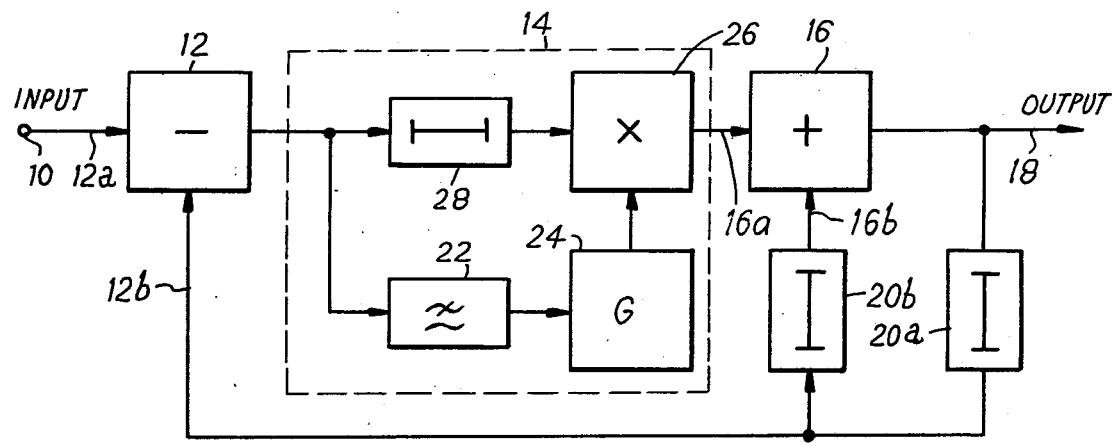
FIG. 3 is a block circuit diagram showing in slightly more detail an improved form of the apparatus.

The circuit of FIG. 3 is based on that of FIG. 1 and only the differences will be described in detail. The construction of the attenuation circuit used in this circuit is shown in more detail, and is seen to consist of a low-pass filter 22 connected to the output of the subtractor 12, a circuit element 24 having a non-linear transfer characteristic, and a multiplier 26 one input of which is connected to the output of the circuit element 24 and the other input of which is coupled via a compensating delay 28 to the output of the subtractor 12.

Figure 4:
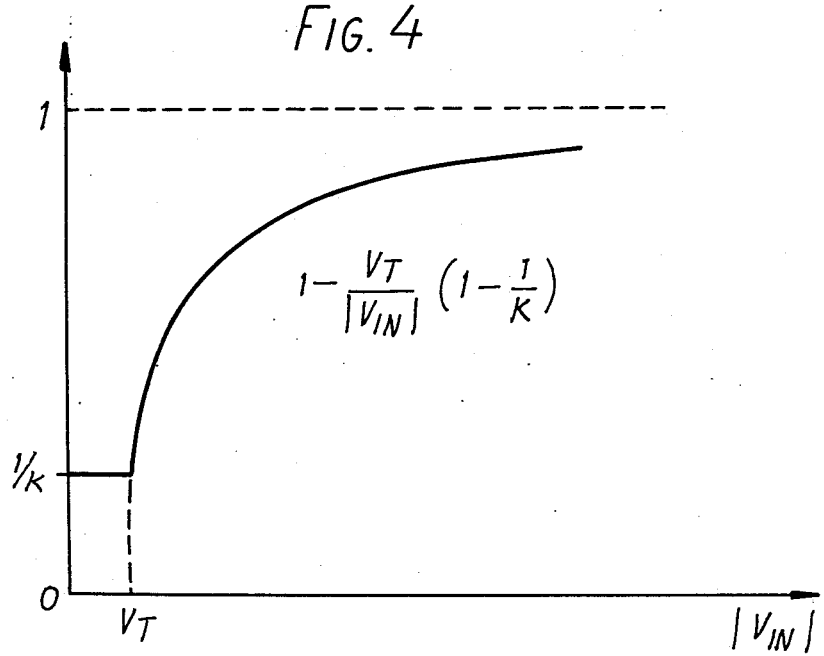
FIG. 4 shows the transfer characteristic of a circuit element in the apparatus of FIG. 3.

The filter 22 may be of one or preferably two dimensional form, that is to say it can operate only on horizontal detail but preferably it operates on both horizontal and vertical detail to remove high frequency components. The non-linear characteristic possessed by the circuit 24 is shown by FIG. 4, where the modulus or amplitude of the input voltage is shown along the abscissa and the output voltage is shown along the ordinate. For input amplitudes lying in the range from zero to a threshold voltage $V_T$ the circuit provides an output $1/K$, and for input amplitudes above the threshold the output is given by the function $1-[V_T(1-1/K)/|V_{IN}|]$. The circuit element 24 may take the form of a read-only memory. The multiplier 26 multiplies the difference signal from the subtractor 12 by the factor provided by the circuit element 24.

This form of attenuation circuit 14 is preferred for the following reasons. If the noise is substantially uncorrelated over the picture the noise frame-difference signals in any region of the picture will tend to cancel each other out. However, where there is movement, particularly of an edge, the frame difference signals will tend to be unipolar, i.e. all of one polarity. Thus if a spatial average is taken over a small area of the picture the ratio of movement-signal to noise will be increased. The filter 22 effects such averaging. If the filter is a transversal type, consisting of a cascade of delay circuits with the signals at the tapping points being subject to weighted addition, and has $n$ coefficients of value $1/n$ the noise power is reduced by a factor of $n$, i.e. 10 $\log_{10} n$ decibels. Thus the threshold in the non-linear function may be reduced by the same number of decibels, thereby reducing the size of exponential tails on moving edges. Moreover, smaller moving edges may now be detected. The averaging area may not be increased too far, however, otherwise the movement signal-to-noise advantage will be lost. The optimum area depends on the speed of movement and a compromise value must be adopted. It is thought that a two-dimensional averaging area of 5 × 5 picture points may be satisfactory for many applications.

By this means the attenuation circuit 14 is better able to distinguish between movement and noise, and so the smearing of edges and loss of texture which may occur with the circuit of FIG. 1 will be considerably reduced at the expense of restoring noise in these areas.

It should be noted that in the FIG. 3 circuit the compensating delay 28 is included to provide a delay time $T_c$ equal to that introduced in the filter 22 and circuit element 24. This necessitates splitting the delay 20 into two delay elements 20a and 20b. The delay element 20a provides a delay of $T_p - T_c$ and is connected between the output of the adder 16 and the inversion input 12b of the subtractor 12. The delay element 20b provides a delay of $T_c$ and is connected between the output of the delay element 20a and the input of adder 16. In this way it is ensured that all the signals reaching the adder 16 are subjected to the same delay time of one picture period.

Figure 5:
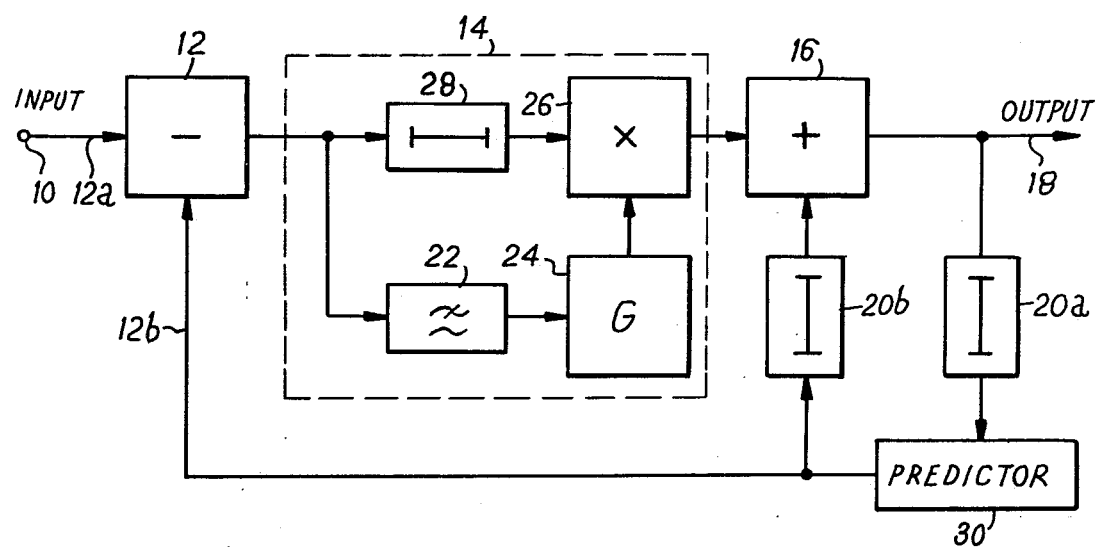
FIG. 5 is a block circuit diagram of a further modification of the apparatus of FIG. 1.

FIG. 5 illustrates a modification of the circuit shown in FIG. 3 and only the differences will therefore be described. It will be seen that the circuits are identical except that the circuit of FIG. 5 includes a predictor circuit 30 connected between the output of the delay element 20a on the one hand and the delay element 20b and the input 12b of subtractor 12 on the other. The predictor circuit could equally well be connected at the input of the delay element 20a or indeed may be incorporated with it into a single circuit. In any event the delay provided by delay element 20a will need to be reduced by the effective amount of any delay introduced by the predictor 30.

The purpose of the predictor 30 is to allow the apparatus to work in situations where the delayed and undelayed signals do not precisely correspond with each other. Two particular instances of this will be described in more detail. The first is where the delay 20 (or 20a plus 20b) provides a delay time of one field period only and not one picture period. With interlaced scanning this means that a current line lies midway between two adjacent lines of the previous field. The second instance is where a one-picture period delay is used, but the processing is applied to composite colour television signals, such as PAL or NTSC signals. In this case the colour subcarrier phase changes as between pictures causing a large difference signal, so that the noise signals would not be reduced by the apparatus. In each case an appropriate predictor circuit can be devised to generate from the delayed signal a signal which corresponds more nearly to the expected current input signal, i.e. to predict the expected value of the undelayed signal in the absence of movement.

Figure 6:
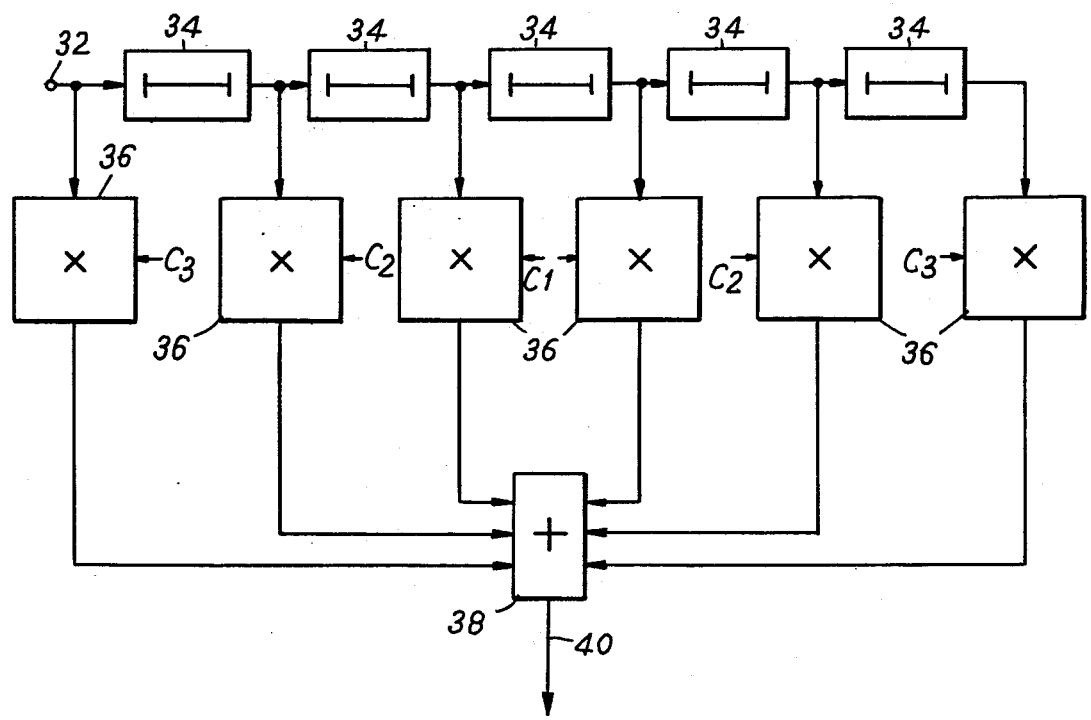
FIG. 6 is a block diagram of a predictor suitable for use in apparatus of the type shown in FIG. 5 having a field store, for processing monochrome signals.

Consideration will first be given to the use of the apparatus with interlaced-scan monochrome signals but in which the delay time provided by delay elements 20a and 20b totals one field period. In this case the predictor may take the form shown in FIG. 6. FIG. 6 shows a transversal filter having an input 32, a chain of (in this case five) one-line delay devices 34 connected in cascade, multipliers 36 connected to respective tappings on the delay chain, and an adder 38 connected to sum the multiplier outputs and to provide an output at a terminal 40. The multipliers 36 are supplied with weighting coefficients at their other inputs, as shown.

The output of the filter of FIG. 6 represents the vertically-interpolated signal on line $n$ derived from the signals on lines $n-312$ and $n-313$; $n-311$ and $n-314$, etc., in the previous interlaced field. The coefficient $C_1$; $C_2$... of the transversal filter are therefore those obtained from an appropriate vertical interpolation aperture. As the interpolated line lies midway between the stored lines, the coefficient values of the interpolator are symmetrical. For ideal interpolation the values are $C_1 = 2/\pi$; $C_2 = -\frac{2}{3}\pi$; $C_3 = 2/5\pi$ etc. In practice linear interpolation using contributions from only lines $n-312$ and $n-313$ with coefficients of 0.5 may be used. In general, higher-order interpolation improves the prediction if the scene contains no spectral components beyond 156 cycles/picture height (c/ph) but degrades it if the scene does contain such components. Linear interpolation is therefore a good compromise.

Such linear vertical interpolation, in general, produces a field-difference signal even on stationary pictures so that vertical resolution is impaired. With high-order interpolation the resolution is substantially unaffected below 156 c/ph. The presence of the field-difference signal on stationary objects makes the detection of movement harder. In particular the threshold in the function G of the circuit element 24 must be raised and noise may break through on large vertical transitions where the difference signal exceeds the threshold.

FIG. 7 shows a second type of predictor which can be employed where the apparatus is to be used with analogue PAL colour television signals. In this case it is assumed that a one-picture period delay is used as the delay 20 (or 20a plus 20b). The predictor comprises the following main elements: namely an input 50 connected to the input 52a of a chrominance filter 52 the output 52b of which is connected both to the input 54a of a chrominance processor circuit 54 and the inversion input 58b of a subtractor 58. The non-inversion input 58a of the subtractor 58 is connected via a compensating delay 56 to the input 50. The output of the subtractor 58 is connected to the input 60a of a luminance processor circuit 60 the output 60b of which is connected to one input of an adder 62. The other input of the adder 62 is connected to the output 54b of the chrominance processor circuit 54, and the adder 62 supplies an output over a line 64.

The chrominance filter 52 serves to pass essentially only the chrominance information in the signal which is then subtracted in subtractor 58 from the PAL signal to provide a signal representing essentially only the luminance information. The chrominance signal is then subjected to modification in the circuit 54 to allow for the subcarrier phase change between pictures. In the example illustrated the luminance signal does not require modification and thus the luminance processor circuit 60 comprises only an equalising delay 82. Finally, the modified chrominance and luminance signals are reunited in the adder 62.

The chrominance filter 52 or separator comprises two two-line delay elements 66 and 68 connected in series, the input to the delay 66 and the output of the delay 68 being averaged in a half-adder and subtracted from the signal at the junction between the delays in a halving subtractor 72. The resultant signal is applied to a bank-pass filter 74 having a pass band from 3.1 MHz to 5.5 MHz, these figures being appropriate for a 625/50 PAL signal as is conventional in the United Kingdom. The chrominance processor circuit 54 comprises a multiplier 76 one input of which receives the output of the chrominance filter 52 and the other of which receives a signal $\sin 2\omega t$ at twice the PAL colour subcarrier frequency which is applied over a line 78. The multiplier output is applied to a band-pass filter 80 which is similar to the filter 74.

The predictor circuitry can be modified for use with digital television signals. Where a line-locked sampling frequency is used the chrominance filter 52 is as illustrated in FIG. 7 with the delays 66 and 68 taking the form of digital stores. The chrominance processor circuit 54, however, now becomes a transversal filter with time varying coefficients. If the sampling frequency is not line locked, for example it may be three times the colour subcarrier frequency, the chrominance filter becomes a generalised two-dimensional filter. If sampling is at fixed preferred subcarrier phases, in accordance with British Pat. No. 1,415,519, (U.S. Pat. No. 3,891,994) with every third sample along the U-axis, the chrominance processor circuit is a time-varying transversal filter with three sets of multiplying coefficients, one set for each sampling phase. Suitable counting circuits are provided to control the indexing of the cyclic pattern. The luminance processor circuit 60 now becomes a fixed-phase interpolator, because the sample positions in the current (undelayed) picture are not identical with those in the previous stored (delayed) picture. This interpolator can again be realized as a time-invariant transversal filter. Such a filter needs to be of a high order if high-frequency stationary luminance information is to be unimpaired, and typically twelve coefficients and eleven one-picture-element delays will be required. The coefficients are static, so that the digital multipliers can take the form of simple read-only memories.

We claim:

1. A method of reducing the effect of noise in an electrical input signal which is obtained by scanning, to provide an output signal, comprising the steps of subtracting from the input for the current scan the said output signal for a preceding scan to provide a difference signal, attenuating low-amplitude portions of the difference signal relative to high amplitude portions thereof, and adding the thus-attenuated signal to the said output signal for the preceding scan to provide an output signal for the current scan.

2. Apparatus for reducing the effect of noise in an electrical signal which is obtained by scanning, comprising the steps of subtracting from the input for the current scan the said output signal for a preceding scan to provide a difference signal, attenuating low-amplitude portions of the difference signal relative to high amplitude portions thereof, and adding the thus-attenuated signal to the said output signal for the preceding scan to provide an output signal for the current scan.

3. Apparatus according to claim 2, wherein the attenuation circuit has an output/input transfer charteristic which below a predetermined level has a first substantially constant slope and above the predetermined level has a second substantially constant slope which is greater than the first slope.

4. Apparatus according to claim 2, wherein the attenuation circuit comprises a multiplier one input of which is coupled to the subtractor output and the other input of which is coupled to the output of a non-linear transfer characteristic element which is also coupled to the subtractor output.

5. Apparatus according to claim 4, wherein the non-linear transfer characteristic element provides a constant output for input signals $V_{IN}$ below a predetermined level $V_T$ and an output $V_{OUT}$ related to the input by the formula:

$$V_{OUT} \propto 1-[V_T(1-1/K)/|V_{IN}|]$$

where $K$ is a constant greater than unity.

6. Apparatus according to claim 4 including a low-pass filter coupled between the subtractor and the non-linear transfer characteristic element.

7. Apparatus according to claim 2, including a predictor circuit in the path of the signal through the delay device to compensate for inherent differences between the input signals during the current and preceding scans.

8. Apparatus according to claim 7, wherein the predictor circuit comprises an interpolator for interpolating between lines of a television signal.

9. Apparatus according to claim 7, wherein the predictor circuit comprises means for changing the phase of the colour subcarrier of a colour television signal.

* * * * *